(12) United States Patent
Burke et al.

(10) Patent No.: US 11,661,980 B2
(45) Date of Patent: May 30, 2023

(54) CENTRIFUGAL LIFT-OFF RATCHETING ONE-WAY CLUTCH WITH ROCKER POCKETS AND FRICTION REDUCTION

(71) Applicant: Schaeffler Technologies AG & Co. KG, Herzogenaurach (DE)

(72) Inventors: Peter Burke, Charlotte, NC (US); Michael Hodge, Creston, OH (US); Carsten Behler, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 74 days.

(21) Appl. No.: 17/359,740

(22) Filed: Jun. 28, 2021

(65) Prior Publication Data
US 2022/0412412 A1 Dec. 29, 2022

(51) Int. Cl.
*F16D 41/12* (2006.01)
*F16D 43/14* (2006.01)

(52) U.S. Cl.
CPC ........ *F16D 41/12* (2013.01); *F16D 2043/145* (2013.01); *F16D 2300/10* (2013.01)

(58) Field of Classification Search
CPC .. F16D 41/12; F16D 41/14; F16D 2041/0601; F16D 43/14; F16D 2043/145; F16D 2300/10
USPC .............................. 192/42, 46, 104 B, 104 C
See application file for complete search history.

(56) References Cited

U.S. PATENT DOCUMENTS

| | | | |
|---|---|---|---|
| 6,575,279 B2* | 6/2003 | Quigley | F16D 41/12 |
| | | | 192/107 T |
| 10,955,014 B1 | 3/2021 | Burke et al. | |
| 2013/0228410 A1* | 9/2013 | Sugimura | F16D 41/12 |
| | | | 192/41 R |
| 2020/0240480 A1 | 7/2020 | Hodge et al. | |
| 2022/0090640 A1* | 3/2022 | Burke | F16D 41/12 |

* cited by examiner

*Primary Examiner* — Richard M Lorence
(74) *Attorney, Agent, or Firm* — Volpe Koenig, P.C.

(57) ABSTRACT

A one-way clutch, including: an outer race; an inner race; and a rocker assembly. The outer race includes: a first outer race plate defining a first rocker pocket; and a second outer race plate non-rotatably connected to the first outer race plate and defining a second rocker pocket. The inner race is axially disposed between the first and second outer race plates. The rocker assembly is at least partly disposed in the first and second rocker pockets and includes a rocker arranged to contact the inner race, a spring guide including a spring arm, and a spring wrapped around the spring arm and urging the rocker in a pivot direction. The one-way clutch includes: a first annular thrust washer axially disposed between the first outer race plate and the inner race; or a friction-reducing coating adhered to the first outer race plate and facing the inner race.

19 Claims, 12 Drawing Sheets

CENTRIFUGAL LIFT-OFF RATCHETING ONE-WAY CLUTCH WITH ROCKER POCKETS AND FRICTION REDUCTION

TECHNICAL FIELD

The present disclosure relates to a centrifugal lift-off ratcheting one-way clutch with dual outer race plates forming chambers for rocker assemblies and with thrust washers or friction-reducing coatings.

BACKGROUND

Known ratcheting one-way clutches are used in a variety of power train configurations.

SUMMARY

According to aspects illustrated herein, there is provided a one-way clutch, including: an outer race; an inner race; and a rocker assembly. The outer race includes: a first outer race plate defining a first rocker pocket; and a second outer race plate non-rotatably connected to the first outer race plate and defining a second rocker pocket. The inner race is axially disposed between the first outer race plate and the second outer race plate. The rocker assembly is at least partly disposed in the first rocker pocket and in the second rocker pocket and includes a rocker arranged to contact the inner race, a spring guide including a spring arm, and a spring wrapped around the spring arm and urging the rocker in a first pivot direction around a pivot axis of the rocker. The one-way clutch includes: a first annular thrust washer axially disposed between the first outer race plate and the inner race; or a friction-reducing coating adhered to the first outer race plate and facing the inner race.

According to aspects illustrated herein, there is provided a one-way clutch, including: an outer race; an inner race; and a rocker assembly. The outer race includes: a first outer race plate defining a first rocker pocket; and a second outer race plate non-rotatably connected to the first outer race plate, and defining a second rocker pocket. The inner race is axially disposed between the first outer race plate and the second outer race plate and includes a radially outermost portion. The rocker assembly is at least partly disposed in the first rocker pocket and in the second rocker pocket; and includes: a rocker arranged to contact the inner race; a spring guide including a spring arm; and a spring wrapped around the spring arm and urging the rocker in a first pivot direction around a pivot axis of the rocker. The one-way clutch includes a first layer of a coating adhered to the surface of the first outer race plate, the coating having a coefficient of friction less than the coefficient of friction of a material forming the inner race; and a second layer of the coating adhered to the second surface of the second outer race plate. At least a portion of the inner race is axially disposed between the first layer and the second layer.

According to aspects illustrated herein, there is provided a one-way clutch, including: an outer race; an inner race; and a rocker assembly. The outer race includes: a first outer race plate defining a first rocker pocket and including a first surface; and a second outer race plate non-rotatably connected to the first outer race plate, defining a second rocker pocket, and including a second surface facing the first surface. The inner race is axially disposed between the first outer race plate and the second outer race plate and includes a radially outermost portion. The rocker assembly is at least partly disposed in the first rocker pocket and in the second rocker pocket and includes a rocker arranged to contact the inner race, a spring guide including a spring arm, and a spring wrapped around the spring arm and urging the rocker in a first pivot direction around a pivot axis of the rocker. The one-way clutch includes: a first thrust washer disposed between the first outer race plate and the inner race; and a second thrust washer disposed between the inner race and the second outer race plate.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices, or materials similar or equivalent to those described herein can be used in the practice or testing of the disclosure.

Figure 1:
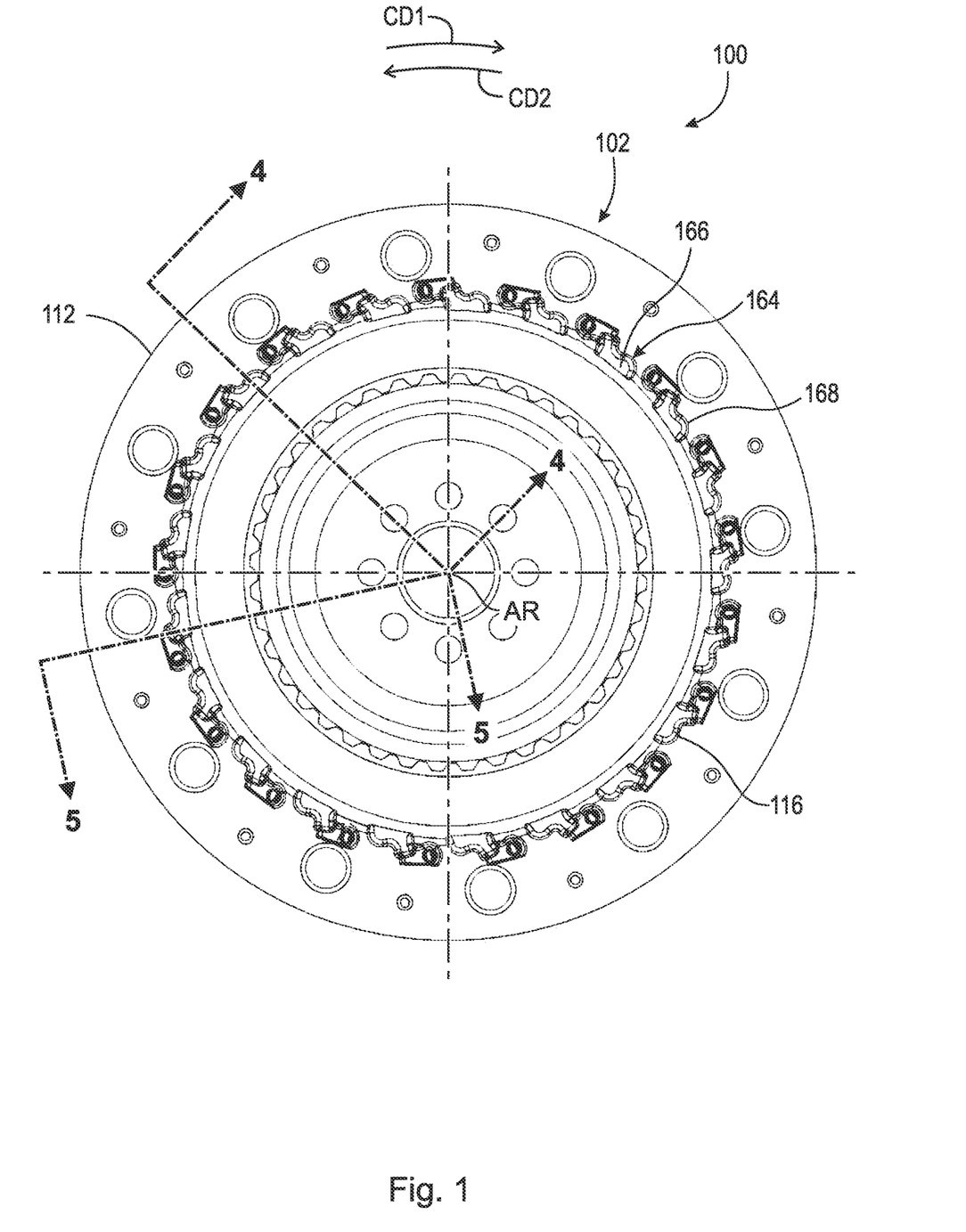
FIG. 1 is a front view of an example centrifugal lift-off ratcheting one-way clutch with rocker pockets.

FIG. 1 is a front view of example centrifugal lift-off ratcheting one-way clutch 100 with rocker pockets.

Figure 2:
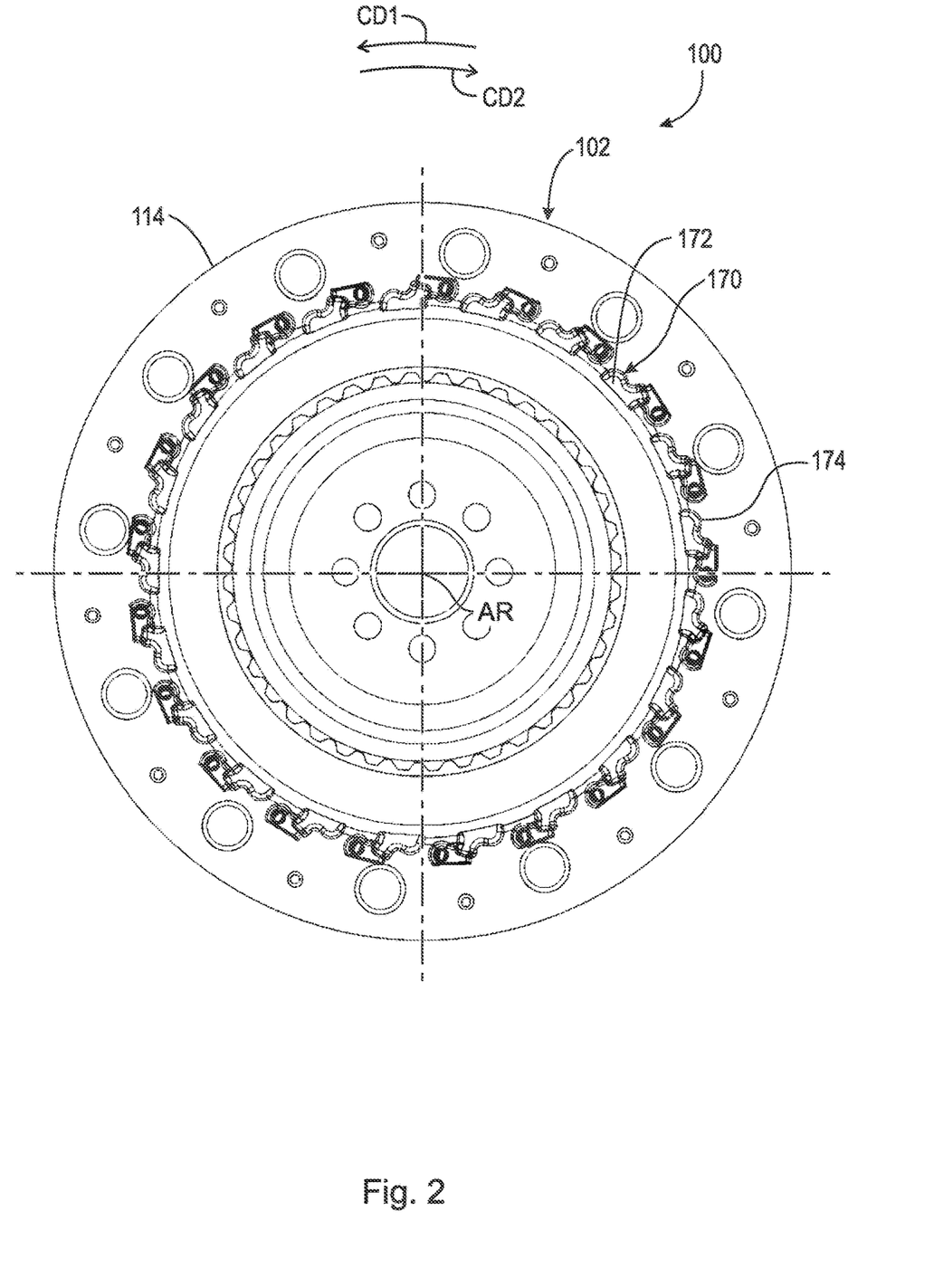
FIG. 2 is a back view of the centrifugal lift-off ratcheting one-way clutch shown in FIG. 1.

FIG. 2 is a back view of centrifugal lift-off ratcheting one-way clutch 100 shown in FIG. 1.

Figure 3:
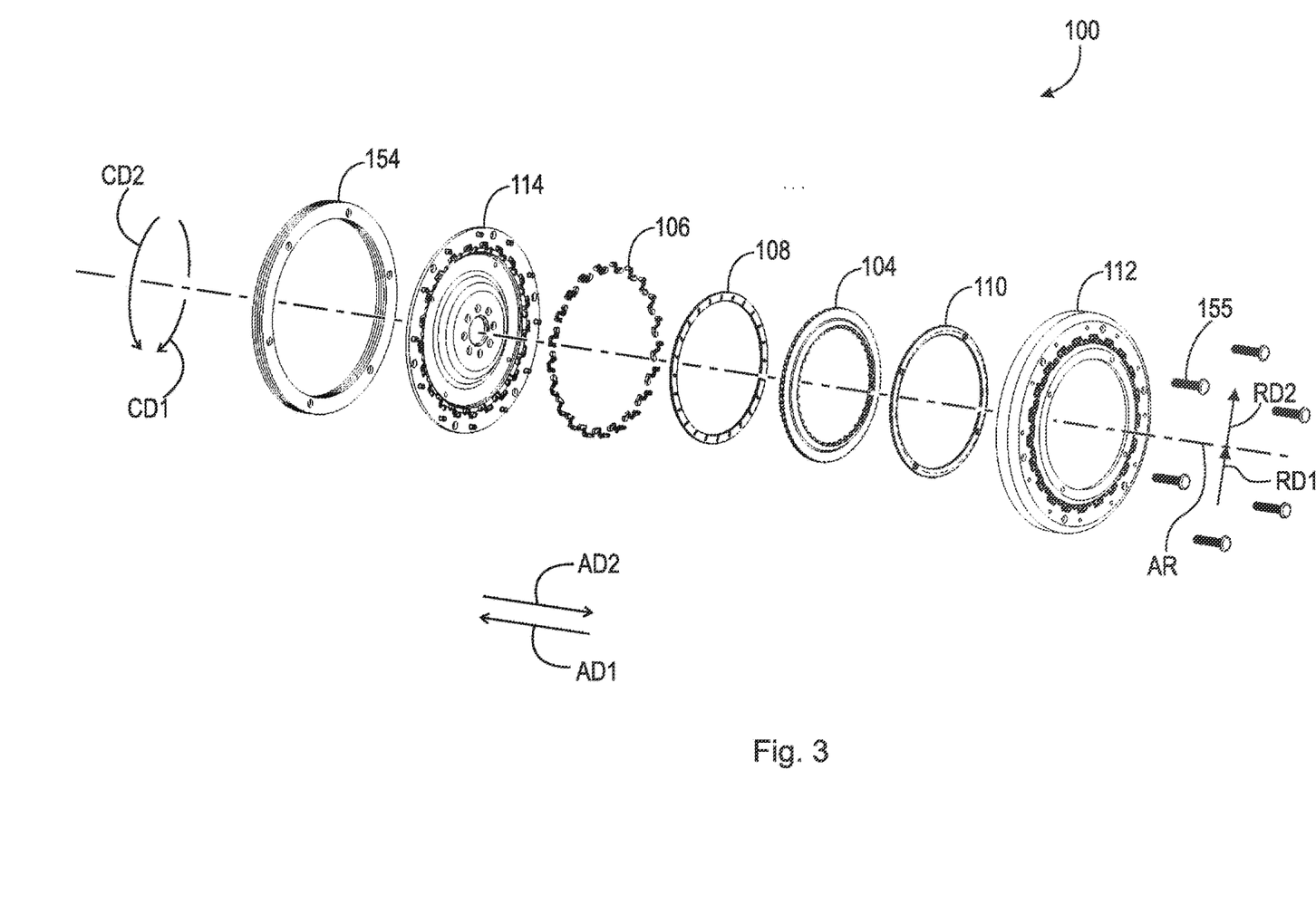
FIG. 3 is an exploded view of the centrifugal lift-off ratcheting one-way clutch shown in FIG. 1.

FIG. 3 is an exploded view of centrifugal lift-off ratcheting one-way clutch 100 shown in FIG. 1.

Figure 4:
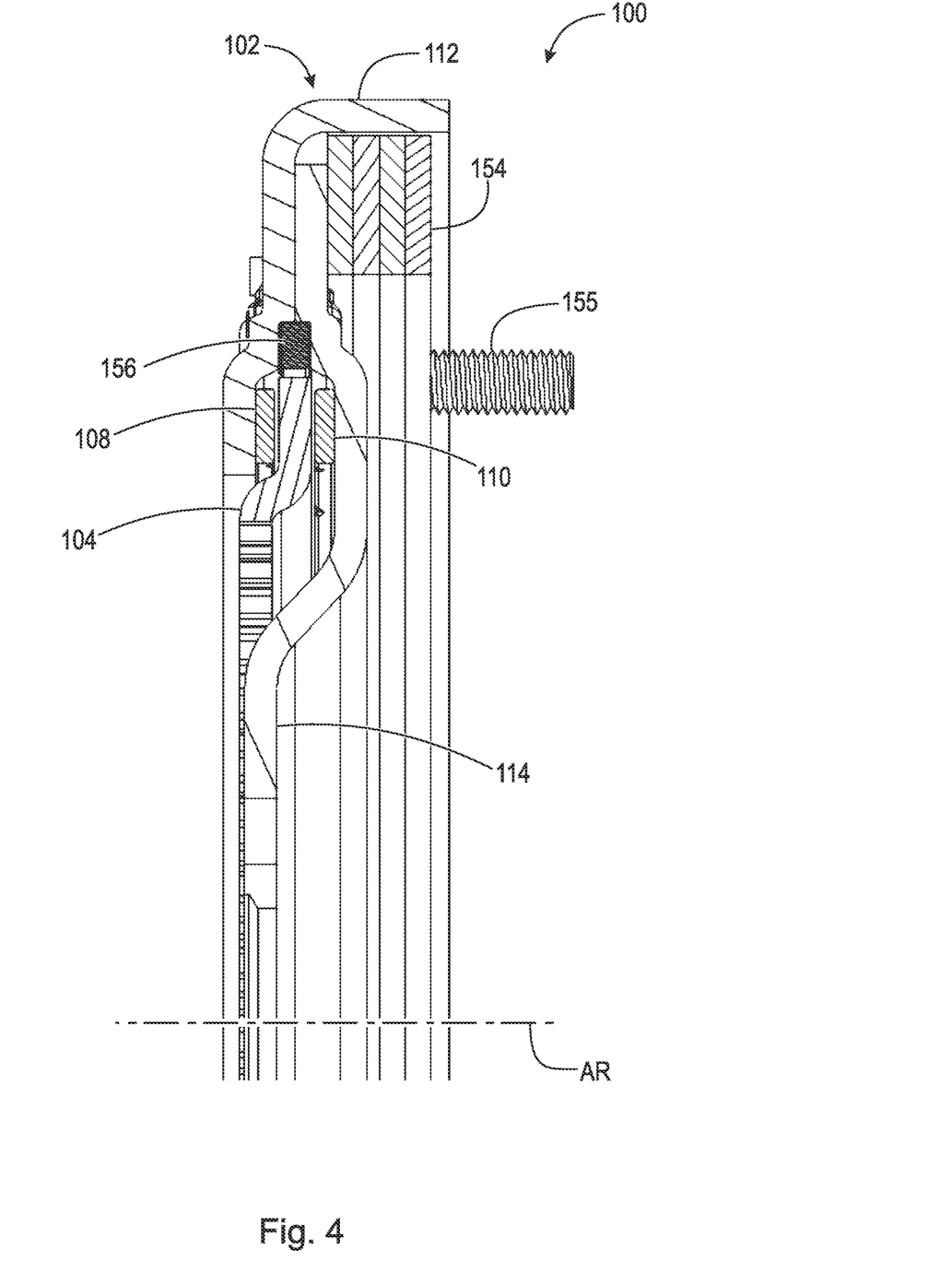
FIG. 4 is a cross-sectional view generally along line 4-4 in FIG. 1.

FIG. 4 is a cross-sectional view generally along line 4-4 in FIG. 1.

Figure 5:
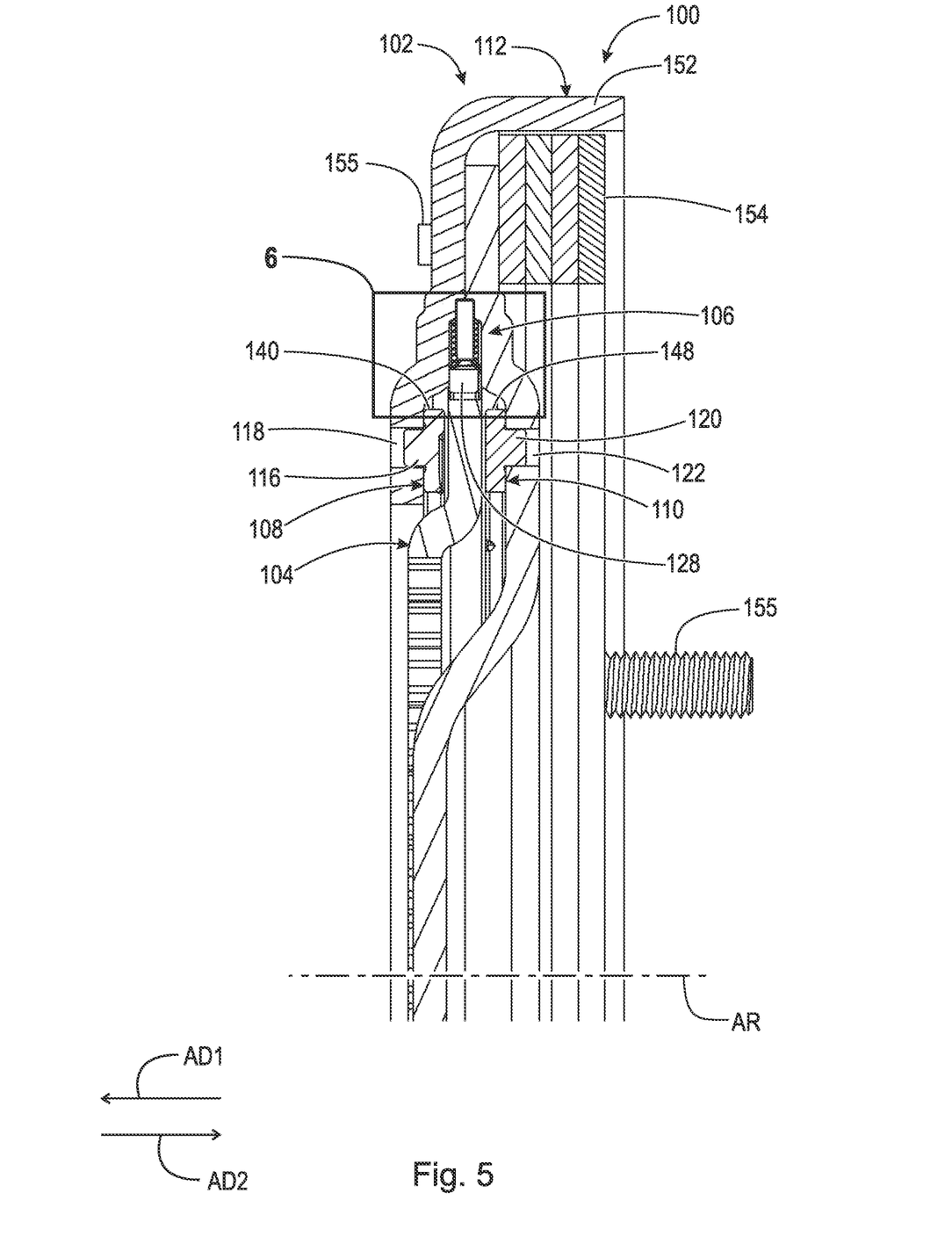
FIG. 5 is a cross-sectional view generally along line 5-5 in FIG. 1.

FIG. 5 is a cross-sectional view generally along line 5-5 in FIG. 1.

Figure 6:
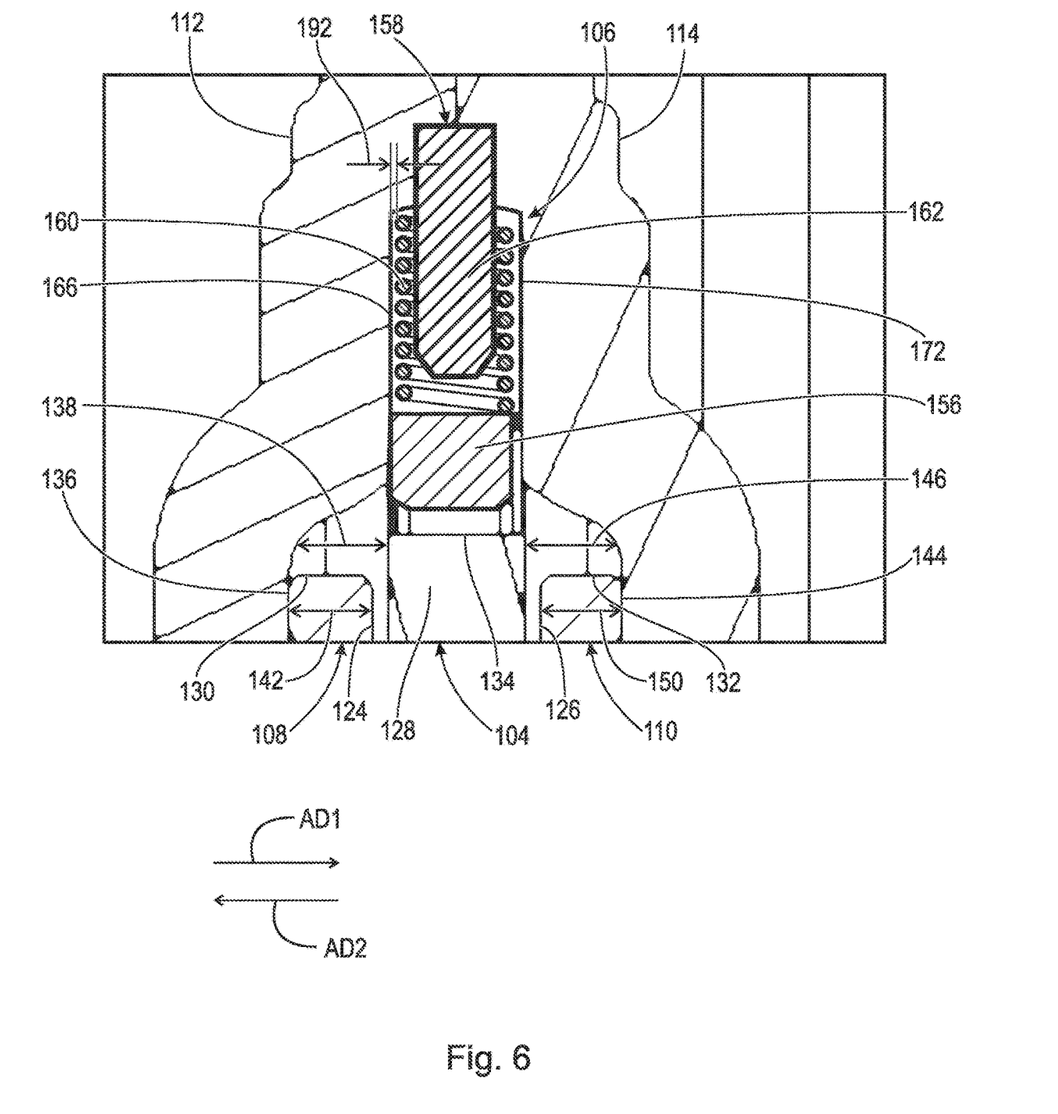
FIG. 6 is a detail of area 6 in FIG. 5.

FIG. 6 is a detail of area 6 in FIG. 5. The following should be viewed in light of FIGS. 1 through 6. Centrifugal lift-off ratcheting one-way clutch 100 includes: outer race 102; inner race 104; rocker assemblies 106; annular thrust washer 108; and annular thrust washer 110. Outer race 104 includes outer race plate 112 and outer race plate 114 non-rotatably connected to plate 112 by any means known in the art. Washer 108 is axially disposed between plate 112 and inner race 104. Washer 110 is axially disposed between inner race 104 and plate 114.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs. Without a further modifier, the non-rotatable connection between or among components is assumed for rotation in any direction. However, the non-rotatable connection can be limited by use of a modifier. For example, "non-rotatably connected for rotation in circumferential direction CD1," defines the connection for rotation only in circumferential direction CD1.

Washer 108 is in contact with plate 112 and is non-rotatably connected to plate 112 with tab 116 in through-bore 118 of plate 112. Washer 110 is in contact with plate 114 and is non-rotatably connected to plate 114 with tab 120 in through-bore 122 of plate 114. In an example embodiment (not shown), one or both of washers 108 and 110 are not fixed to outer race 102 or inner race 104 and are rotatable with respect to plates 112 and 114. Washer 108 includes surface 124, facing in axial direction AD1 parallel to axis of rotation AR of clutch 100, and orthogonal to axis AR, Washer 110 includes surface 126, facing in axial direction AD2 opposite direction AD1, and orthogonal to axis AR. Inner race 104 includes radially outermost portion 128 axially disposed between and axially aligned with surfaces 124 and 126. In an example embodiment (not shown), one or both of washers 108 and 110 are rotatable with respect to plates 112 and 114, respectively.

Washer 108, washer 110, and race 104 include radially outermost surfaces 130, 132, and 134, respectively. In the example of FIG. 1, surface 134 is radially outward of surfaces 130 and 132. Plate 112 includes surface 136 orthogonal to axis AR and facing direction AD1. Surface 136 is separated from inner race 104 by axial distance 138 in direction AD1, Washer 108: includes radially outermost portion 140 including surface 130; and has axial thickness 142 in direction AD1, less than distance 138. Washer 110 includes surface 144 orthogonal to axis AR and facing in direction AD2. Surface 144 is separated from inner race 104 by axial distance 146 in direction AD2. Washer 110: includes radially outermost portion 148 including surface 132; and has axial thickness 150, in direction AD2, less than axial distance 146.

Radially outermost portion 152 of plate 112 forms the radially outermost portion of clutch 100. Clutch 100 includes inertial ring 154 fixedly connected to outer race 102 and radially aligned with portion 152. In the example of FIG. 1, ring 154 is multi-layered.

Figure 7:
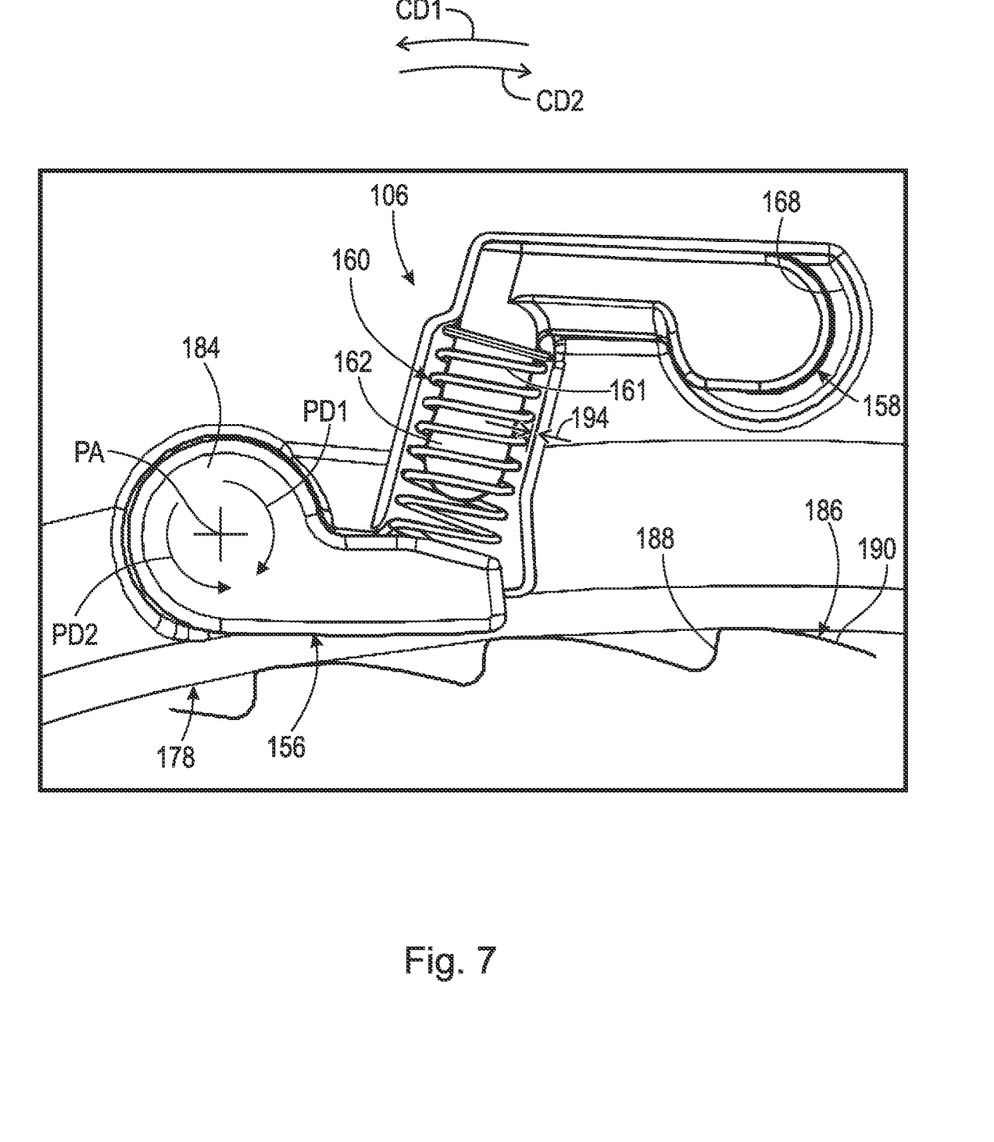
FIG. 7 is a back view of a pocket shown in FIG. 1, with a rocker assembly in a lift-off mode.

FIG. 7 is a back view of a pocket, in front outer race plate 112 shown in FIG. 1, with rocker assembly 106 in a lift-off mode.

Figure 8:
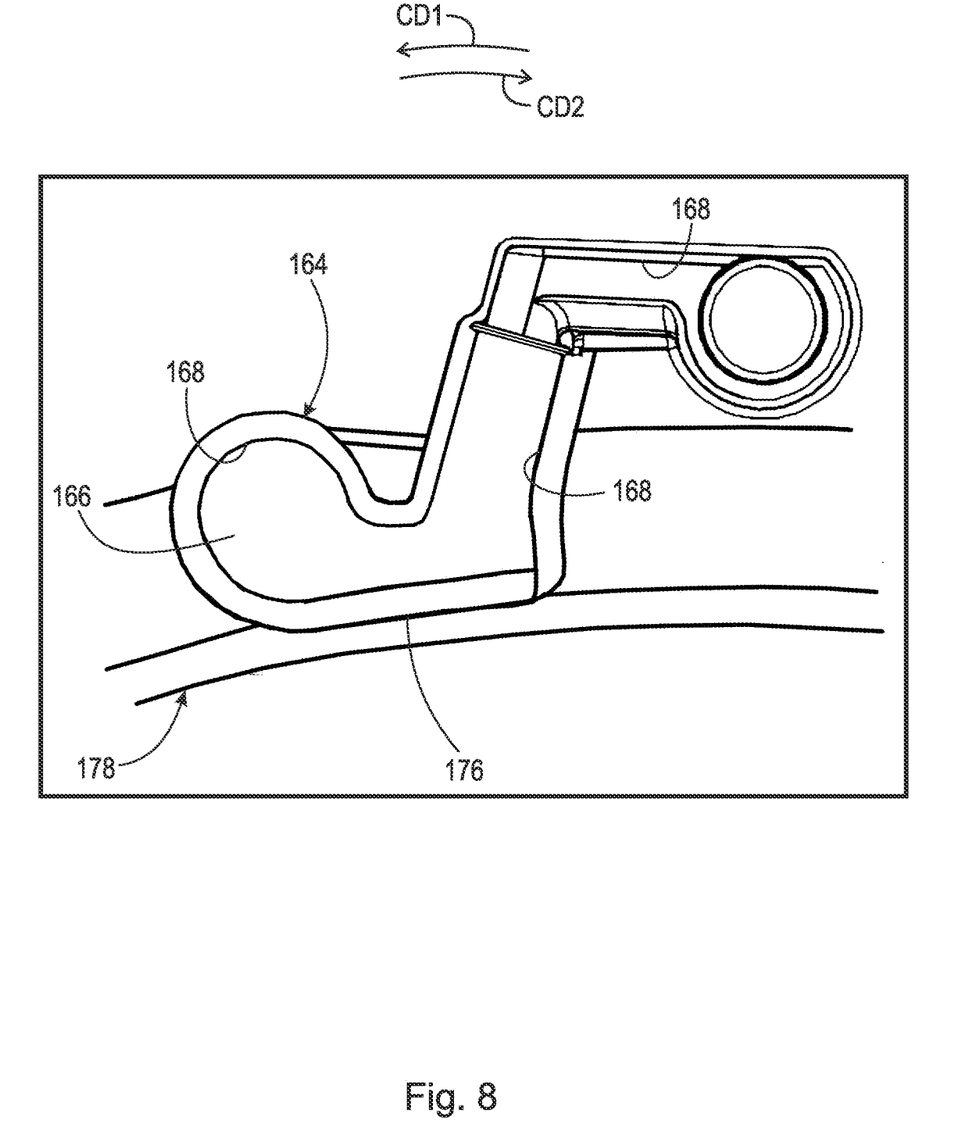
FIG. 8 is the back view of the pocket shown in FIG. 7, without the rocker assembly.

FIG. 8 is the back view of the pocket shown in FIG. 7, with rocker assembly 106 removed. The following should be viewed in light of FIGS. 1 through 8. Each rocker assembly 106 includes: rocker 156; spring guide 158; and spring 160. Spring 160 includes helical coils 161. Spring guides 158 include spring arms 162. Each spring 160 is wrapped around a respective arm 162.

Outer race plate 112 defines pockets 164. For example, outer race plate 112 includes rocker pocket walls 166 and rocker pocket walls 168. Pocket walls 166 face at least partly in axial direction AD1 and define pockets 164 in axial direction AD2. By "define a pocket in a direction, we mean to form a boundary of the pocket in the direction, Pocket walls 168 define pockets 164 in: radially inner direction RD1 and radially outer directions RD2, respectively; and opposite circumferential directions CD1 and CD2, around axis of rotation AR.

Figure 9:
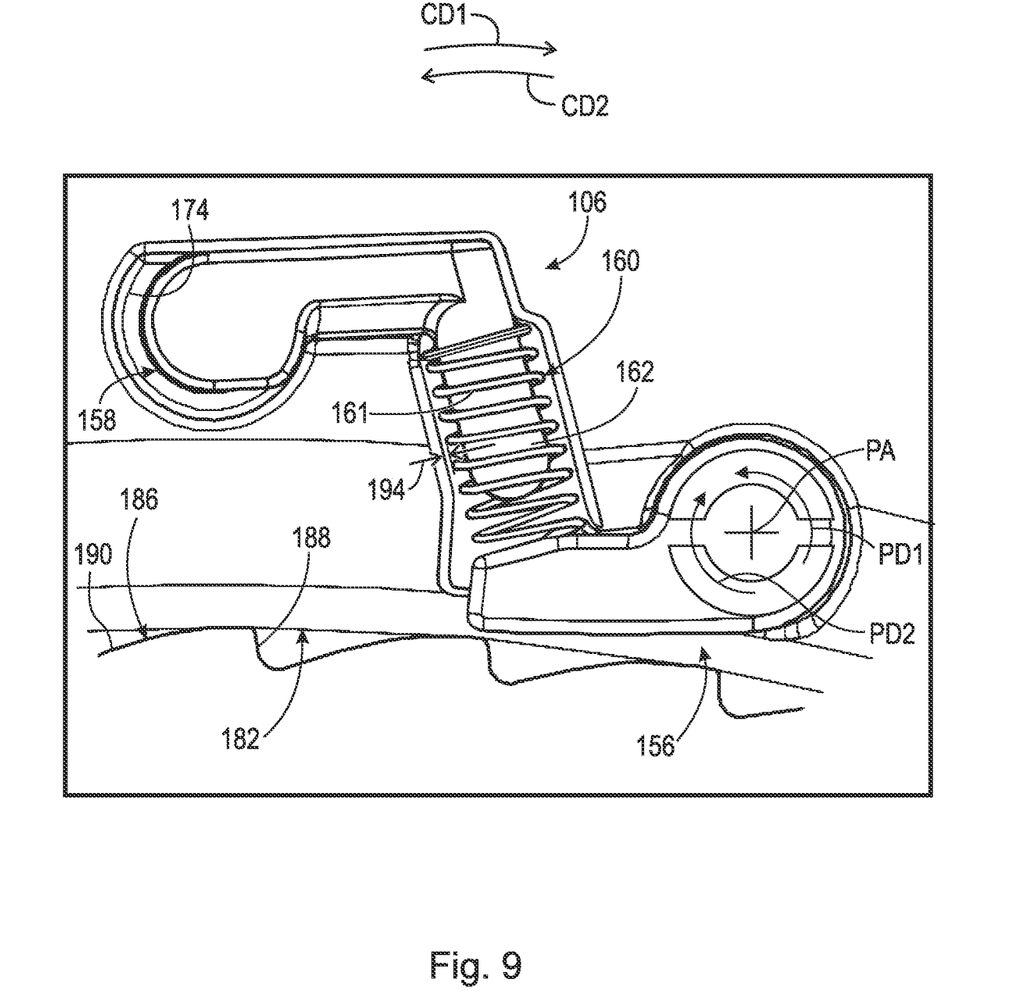
FIG. 9 is a front view of a pocket shown in FIG. 2, with a rocker assembly in a locked mode.
Figure 10:
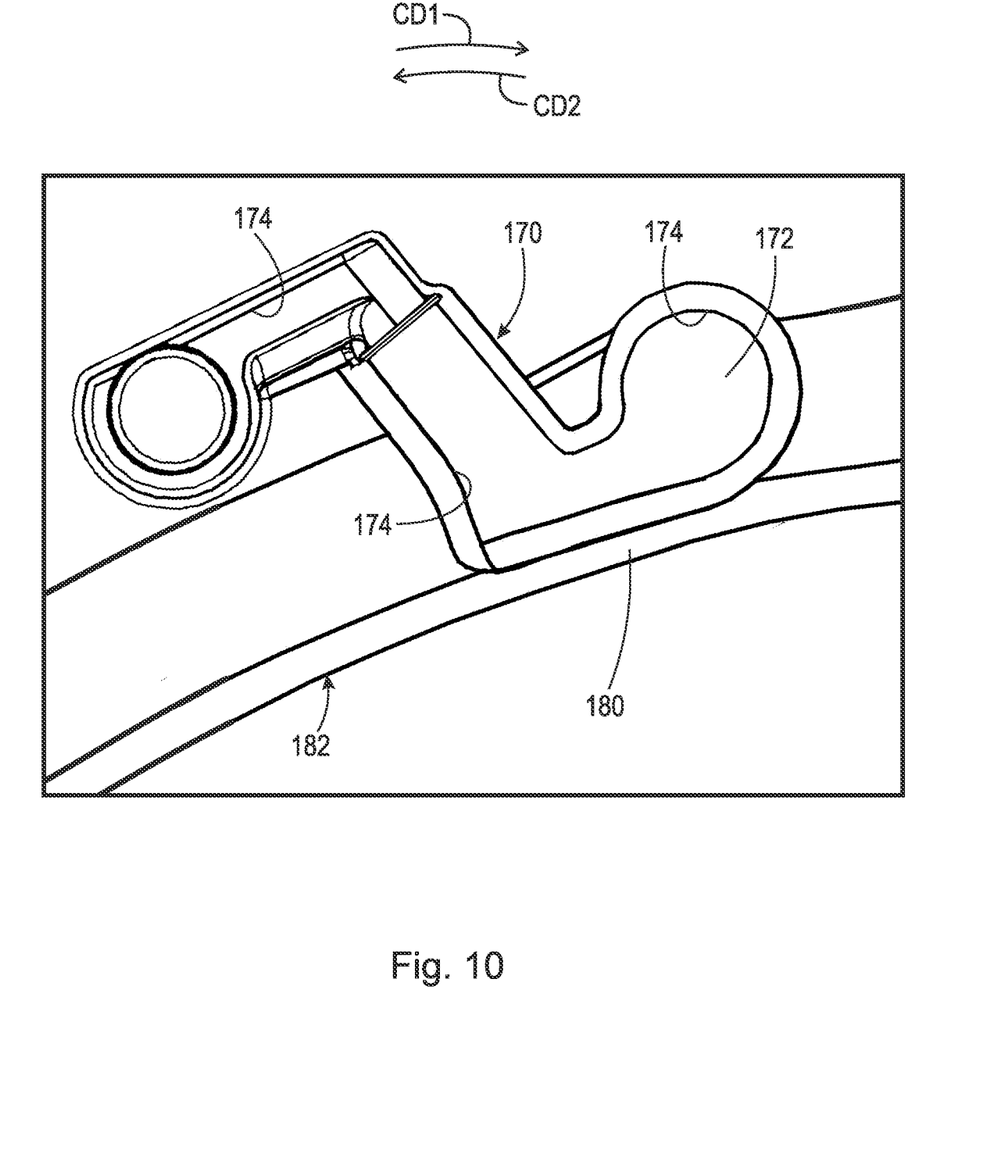
FIG. 10 is the back view of the pocket shown in FIG. 9, without the rocker assembly.

FIG. 10 is the front view of the pocket shown in FIG. 9 with rocker assembly 106 removed. The following should be viewed in light of FIGS. 1 through 10. Outer race plate 114 defines pockets 170. For example, outer race plate 114 includes rocker pocket walls 172 and rocker pocket walls 174. Pocket walls 172 face at least partly in axial direction AD2 and define pockets 170 in axial direction AD1. Pocket walls 174 define pockets 170 in: radially inner and outer directions RD1 and RD2, respectively; and circumferential directions CD1 and CD2.

FIG. 10 is the front view of the pocket shown in FIG. 9 with rocker assembly 106 removed. The following should be viewed in light of FIGS. 1 through 10. Outer race plate 114 defines pockets 170. For example, outer race plate 114 includes rocker pocket walls 172 and rocker pocket walls 174. Pocket walls 172 face at least partly in axial direction AD2 and define pockets 170 in axial direction AD1. Pocket walls 174 define pockets 170 in: radially inner and outer directions RD1 and RD2, respectively; and circumferential directions CD1 and CD1.

Walls 166 and 168 define, at least partly openings 176, facing radially inwardly, in circumferential wall 178 of plate 112. Walls 172 and 174 define, at least partly, openings 180, facing radially inwardly, in circumferential wall 182 of plate 114. Rockers 156 extend radially inwardly from pockets 164 and 170 through openings 176 and 180, respectively.

Springs 160 urge rockers 156 in pivot direction PD1 around pivot axis PA passing through portions 184 of rockers 156. Portions 184 are not rotatable in direction CD1 or CD2 with respect to outer race 102. Inner race 104 includes teeth 186 with surfaces 188 facing at least partly in direction CD1 and ramp surfaces 190 sloping radially inwardly in direction CD2.

As seen, for example, in FIG. 6, rocker assembly 106 is partly disposed in pocket 164 and partly disposed in pocket 170. Springs 160 are wrapped around and in contact with spring arms 162. Springs 160 are retained in place at least partly by spring guides 158 and spring arms 162. In the example of FIG. 1, springs 160 are retained in place solely by spring guides 158 and spring arms 162. For example, at least one half of coils 161 are free of contact with plates 112 and 114. In the example of FIG. 1, every coil 161 is free of contact with plates 112 and 114. For example: pocket walls 166 and 172 are separated from coils 161 by gap 192; and walls 168 and 174 are separated from coils 161 by gap 194.

Figure 11:
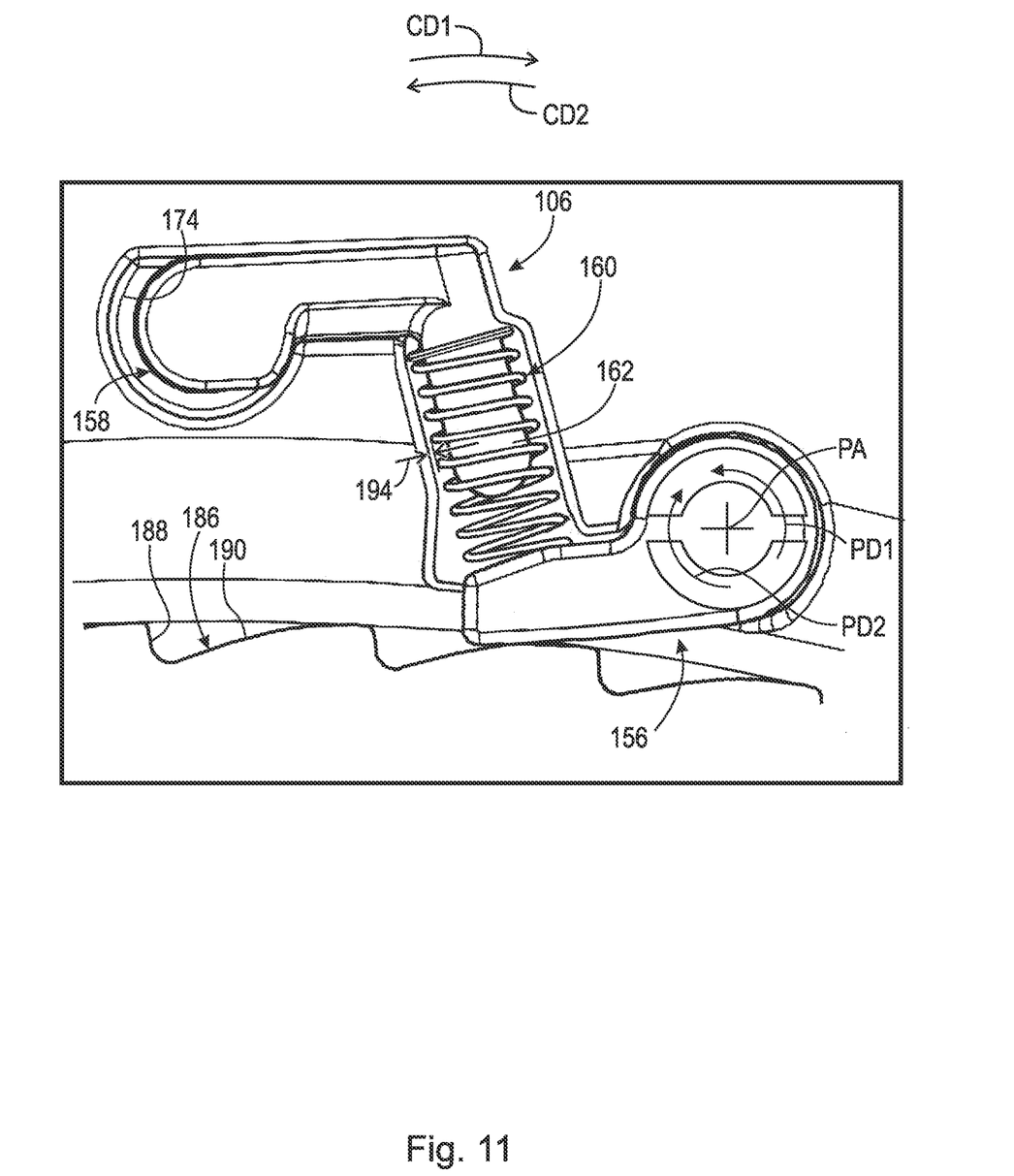
FIG. 11 is a front view of the pocket shown in FIG. 9, with the rocker assembly in a free-wheel mode; and, FIG. 12 is the detail of area 6 with friction-reducing coatings replacing thrust washers.

FIG. 11 is a front view of the pocket 172 in rear outer race plate 114, shown in FIG. 9, with rocker assembly 106 in a free-wheel mode. Rockers 156 are pivotable around axis PA to shift clutch 100 among the locked, free-wheel, and lift-off modes. The following should be viewed in light of FIGS. 1 through 11. For the free-wheel mode of FIG. 11, rotational torque transmitted through clutch 100 causes rotation of outer race 102, in direction CD1, with respect to inner race 104. Rockers 106 slide radially outwardly along successive ramp surfaces 190 in direction CD1 without contacting surfaces 188. Thus, outer race 102 remains rotatable with respect to inner race 104 in direction CD1.

For the lift-off mode of FIG. 7, rotational torque is applied to outer race 102 in direction CD1 and clutch 100 is initially in the free-wheel mode. When the speed of the rotation of outer race 102, in direction CD1 with respect to inner race 104, has increased sufficiently, clutch 100 transitions to the lift-off mode. In particular, the centrifugal force generated by the rotation of outer race 102 rotates rockers 156 in direction PD2, compressing springs 160, and lifting rockers 156 radially outward of teeth 186.

For the locked mode of FIG. 9, rotational torque transmitted through clutch 100 causes rotation of outer race 102, in direction CD2, with respect to inner race 104. Springs 160 urge at least one rocker 156 in direction PD1 and into contact with a surface 190 of a tooth 186. The rocker 156 slides along the surface 190 in direction CD2 until the rocker contacts the surface 188 of the tooth 186, which blocks further rotation of outer race 102, with respect to inner race 104, in direction CD2.

As is known in the art, rotational torque transmitted through a one-way clutch can cause relative axial displacement between an outer race and an inner race of the clutch, which can result in frictional contact between the outer race and the inner race, which reduces the torque transfer efficiency of the clutch and causes wear of and reduction of service life of the clutch. Thrust washers 108 and 110 prevent contact between outer race 102 and inner race 104 resulting from torque transmission through clutch 100, and reduce friction losses resulting from the axial displacement between outer race 102 and inner race 104. For example: if the torque transmission urges inner race 104 and outer race plate 112 toward each other, thrust washer 108 contacts inner race 104 and plate 112; and if the torque transmission urges inner race 104 and outer race plate 114 toward each other, thrust washer 110 contacts inner race 104 and plate 114.

Figure 12:
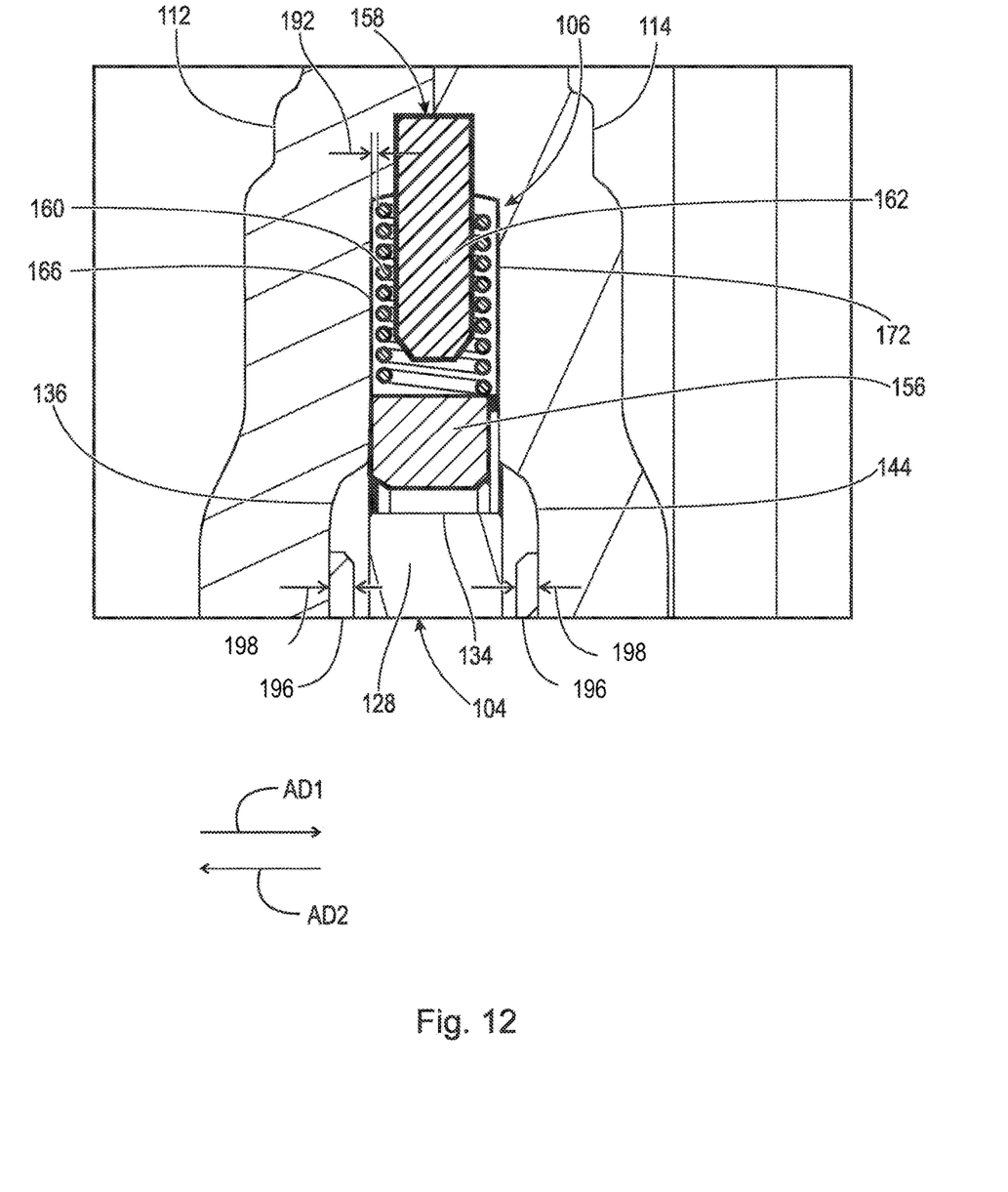

FIG. 12 is the detail of area 6 with friction-reducing coatings replacing thrust washers 108 and 110. Unless specified otherwise, the discussion for FIGS. 1 through 11 is applicable to FIG. 12. In the example of FIG. 12, thrust washers 108 and 110 have been removed and friction-reducing coating 196 is adhered to surfaces 136 and 144. In the example of FIG. 1, coating 196 has a coefficient of friction less than the coefficient of friction of material forming inner race 104. At least a portion of inner race 104 is axially disposed between coating 196 on outer race plate 112 and coating 196 on outer race plate 114. Thickness 198 of coatings 196 is exaggerated for purposes of illustration. Coatings 196 prevent frictional contact between outer race 102 and inner race 104. For example: if the torque transmission urges inner race 104 and outer race plate 112 toward each other, coating 196 on washer 108 contacts inner race 104; and if the torque transmission urges inner race 104 and outer race plate 114 toward each other, coating 196 on washer 110 contacts inner race 104.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
AR axis of rotation
CD1 circumferential direction
CD2 circumferential direction
PA pivot axis
PD1 pivot direction
PD2 pivot direction
100 centrifugal lift-off ratcheting one-way clutch
102 outer race
104 inner race
106 rocker assembly
108 annular thrust washer
110 annular thrust washer
112 outer race plate
114 outer race plate
116 tab, thrust washer
118 through-bore, outer race plate
120 tab, thrust washer
122 through-bore, outer race plate
124 surface, annular thrust washer
126 surface, annular thrust washer
128 radially outer portion, inner race
130 radially outermost surface, annular thrust washer
132 radially outermost surface, annular thrust washer
134 radially outermost surface, inner race
136 surface, outer race plate
138 axial distance
140 radially outermost portion, annular thrust washer
142 axial thickness
144 surface, outer race plate
146 axial distance
148 radially outermost portion, annular thrust washer
150 axial thickness
152 radially outermost portion, outer race plate
154 inertial ring
155 fastener
156 rocker
158 spring guide
160 spring
161 helical coil, spring
162 spring arm
164 pocket
166 pocket wall
168 pocket wall
170 pocket
172 pocket wall
174 pocket wall
176 opening, pocket
178 circumferential wall, outer race plate
180 opening, pocket
182 circumferential wall, outer race plate
184 portion, rocker
186 tooth, inner race
188 surface, tooth
190 ramp surface, tooth 192 gap
194 gap
196 anti-friction coating
198 thickness coating

The invention claimed is:

1. A one-way clutch, comprising:
an outer race including:
a first outer race plate defining a first rocker pocket, the first outer race plate forming a radially outermost portion of the one-way clutch; and,
a second outer race plate:
non-rotatably connected to the first outer race plate; and,
defining a second rocker pocket;
an inner race axially disposed between the first outer race plate and the second outer race plate;
a rocker assembly at least partly disposed in the first rocker pocket and in the second rocker pocket; and including:
a rocker arranged to contact the inner race;
a spring guide including a spring arm; and,
a spring wrapped around the spring arm and urging the rocker in a first pivot direction around a pivot axis of the rocker; and,
a first annular thrust washer axially disposed between the first outer race plate and the inner race; or,
a friction-reducing coating adhered to first outer race plate and facing the inner race.

2. The one-way clutch of claim 1, wherein:
the spring includes a plurality of helical coils;
the first outer race plate includes a first rocker pocket wall defining the first rocker pocket in a first axial direction parallel to an axis of rotation of the one-way clutch;
the second outer race plate includes a second rocker pocket wall defining the second rocker pocket in a second axial direction opposite the first axial direction;
the spring is axially located between the first rocker pocket wall and the second rocker pocket wall; and,
at least one half of the helical coils included in the plurality of helical coils are free of contact with the first rocker pocket wall and the second rocker pocket wall.

3. The one-way clutch of claim 1, wherein:
the spring includes a plurality of helical coils;
the first outer race plate includes a pocket wall defining the first rocker pocket in:
a radially outer direction orthogonal to an axis of rotation of the one-way clutch;
a first circumferential direction around the axis of rotation; and,
a second circumferential direction opposite the first circumferential direction; and,
at least one half of the helical coils included in the plurality of helical coils are free of contact with the pocket wall.

4. The one-way clutch of claim 1, wherein:
the spring includes a plurality of helical coils;
the second outer race plate includes a pocket wall defining the second rocker pocket in:
a radially outer direction orthogonal to an axis of rotation of the one-way clutch;
a first circumferential direction around the axis of rotation; and,
a second circumferential direction opposite the first circumferential direction; and,
at least one half of the helical coils included in the plurality of helical coils are free of contact with the pocket wall.

5. The one-way clutch of claim 1, wherein:
the one-way clutch includes the first annular thrust washer; and,
the first annular thrust washer is in contact with the first outer race plate.

6. The one-way clutch of claim 1, wherein:
the one-way clutch includes the first annular thrust washer; and,
the first annular thrust washer is non-rotatably connected to the first outer race plate.

7. The one-way clutch of claim 1, wherein:
the one-way clutch includes the first annular thrust washer;
the first annular thrust washer includes a first radially outermost surface;
the inner race includes a second radially outermost surface; and,
the first radially outermost surface is radially inward of the second radially outermost surface.

8. The one-way clutch of claim 1, wherein:
the one-way clutch includes the first annular thrust washer; and,
the first outer race plate and the inner race are separated by an axial distance in an axial direction parallel to an axis of rotation of the one-way clutch; and,
the first annular thrust washer has an axial thickness, in the axial direction, less than the axial distance.

9. The one-way clutch of claim 1, wherein the one-way clutch includes the first annular thrust washer, the one-way clutch further comprising:
a second annular thrust washer axially disposed between the inner race and the second outer race plate.

10. The one-way clutch of claim 9, wherein the second annular thrust washer is in contact with the second outer race plate.

11. The one-way clutch of claim 9, wherein the second annular thrust washer is non-rotatably connected to the second outer race plate.

12. The one-way clutch of claim 9, wherein:
the second outer race plate and the inner race are separated by an axial distance in an axial direction parallel to an axis of rotation of the one-way clutch; and,
the second annular thrust washer has an axial thickness, in the axial direction, less than the axial distance.

13. The one-way clutch of claim 1, further comprising:
an inertial ring fixedly connected to the first outer race plate and radially aligned with the radially outermost portion of the one-way clutch.

14. The one-way clutch of claim 1, wherein:
in a locked mode of the one-way clutch, the rocker is in contact with the inner race to block rotation of the outer race, with respect to the inner race, in a first circumferential direction around an axis of rotation of the one-way clutch;
in a free-wheel mode of the one-way clutch, the outer race is rotatable, with respect to the inner race, in a second circumferential direction, opposite the first circumferential direction; and,
the rocker is pivotable to switch the one-way clutch between the locked mode and the free-wheel mode.

15. A one-way clutch, comprising:
an outer race including:
a first outer race plate defining a first rocker pocket; and,
a second outer race plate:
non-rotatably connected to the first outer race plate; and, defining a second rocker pocket;
an inner race axially disposed between the first outer race plate and the second outer race plate and including a radially outermost portion;
a rocker assembly at least partly disposed in the first rocker pocket and in the second rocker pocket; and including:
  a rocker arranged to contact the inner race;
  a spring guide including a spring arm; and,
  a spring wrapped around the spring arm and urging the rocker in a first pivot direction around a pivot axis of the rocker;
a first thrust washer disposed between the first outer race plate and the inner race; and,
a second thrust washer disposed between the inner race and the second outer race plate.

16. The one-way clutch of claim 15, wherein:
the spring includes a plurality of helical coils; and,
at least one half of the helical coils included in the plurality of helical coils are free of contact with the first outer race plate or the second outer race plate.

17. The one-way clutch of claim 15, further comprising:
an inertial ring fixedly connected to the first outer race plate, wherein:
  the first outer race plate forms a radially outermost portion of the one-way clutch; and,
  the inertial ring is radially aligned with the radially outermost portion of the one-way clutch.

18. A one-way clutch, comprising:
an outer race including:
  a first outer race plate defining a first rocker pocket and including a first surface; and,
  a second outer race plate:
    non-rotatably connected to the first outer race plate;
    defining a second rocker pocket; and,
    including a second surface facing the first surface;
an inner race axially disposed between the first outer race plate and the second outer race plate and including a radially outermost portion;
a rocker assembly at least partly disposed in the first rocker pocket and in the second rocker pocket; and including:
  a rocker arranged to contact the inner race;
  a spring guide including a spring arm; and,
  a spring wrapped around the spring arm and urging the rocker in a first pivot direction around a pivot axis of the rocker;
a first layer of a friction-reducing coating adhered to the first surface of the first outer race plate, the friction-reducing coating having a coefficient of friction less than the coefficient of friction of a material forming the inner race; and,
a second layer of the friction-reducing coating adhered to the second surface of the second outer race plate.

19. The one-way clutch of claim 18, wherein:
the spring includes a plurality of helical coils; and,
an at least one half of the helical coils included in the plurality of helical coils are free of contact with the first outer race plate or the second outer race plate.

\* \* \* \* \*